United States Patent
Viala et al.

(10) Patent No.: US 8,916,391 B2
(45) Date of Patent: Dec. 23, 2014

(54) RADIO-FREQUENCY DEVICE COMPRISING A THIN FILM WITH HIGH PERMITTIVITY AND PERMEABILITY

(75) Inventors: Bernard Viala, Sassenage (FR); Evangeline Benevent, Grenoble (FR); Christophe Dubarry, Claix (FR); Kévin Garello, Locmaria-Plouzane (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 666 days.

(21) Appl. No.: 12/580,342

(22) Filed: Oct. 16, 2009

(65) Prior Publication Data

US 2010/0151797 A1 Jun. 17, 2010

(30) Foreign Application Priority Data

Dec. 11, 2008 (FR) .................................. 08 58470

(51) Int. Cl.
*H01L 21/20* (2006.01)
*H01F 10/32* (2006.01)
*H01F 41/32* (2006.01)
*H01Q 17/00* (2006.01)
*H01Q 1/38* (2006.01)
*B82Y 25/00* (2011.01)

(52) U.S. Cl.
CPC ............ *H01F 10/3218* (2013.01); *H01F 41/32* (2013.01); *H01Q 17/00* (2013.01); *H01Q 1/38* (2013.01); *B82Y 25/00* (2013.01)
USPC .................................. 438/3; 257/421; 455/73

(58) Field of Classification Search
CPC .................... H01L 29/4908; H01L 21/02197; H01L 21/02293; H01L 21/28158; H01L 21/28194; H01L 21/28291; H01L 21/31691; H01L 28/56; H01L 29/517
USPC ......... 257/310, 330, 374, 499, 501, 506, 421; 455/73; 204/192.11; 438/3
See application file for complete search history.

(56) References Cited

U.S. PATENT DOCUMENTS

| | | | |
|---|---|---|---|
| 5,728,481 A | 3/1998 | Kasai et al. | |
| 5,886,867 A * | 3/1999 | Chivukula et al. | ............ 361/311 |
| 2006/0256480 A1* | 11/2006 | Hayakawa | ..................... 360/313 |
| 2008/0020509 A1* | 1/2008 | Kunitake et al. | .............. 438/104 |

OTHER PUBLICATIONS

A.S. Tatarenko et al., "*Miniature Antenna Based on Magnetoelectric Composites,*" Electronics Letters, IEE Stevenage, GB, Apr. 10, 2008, vol. 44, No. 8, pp. 506-508.
Markus Niederberger et al., "*A general Soft-Chemistry Route to Perovskites and Related Materials: Synthesis of BaTiO₃, BaZrO₃, and LiNbO₃, Nanoparticles,*" Communications, Angew. Chem. Int. Ed., 2004, vol. 43, pp. 2270-2273.

* cited by examiner

*Primary Examiner* — Ping Hsieh
*Assistant Examiner* — Angelica M Perez
(74) *Attorney, Agent, or Firm* — Burr & Brown, PLLC

(57) ABSTRACT

A radio-frequency device comprises magneto-dielectric elements. At least one of these elements comprises a composite thin film. This film comprises a magnetic material offering permeability above 10 at 1 GHz and a dielectric material offering permittivity above 10 at 1 GHz.

17 Claims, 2 Drawing Sheets

RADIO-FREQUENCY DEVICE COMPRISING A THIN FILM WITH HIGH PERMITTIVITY AND PERMEABILITY

FIELD OF THE INVENTION

The invention relates to the general field of radio-frequency transceivers, but also to the field of information processing employing thin layer magnetic and dielectric systems technology. To be more specific, the frequency field specified is between about a hundred Megahertz and several tens of Gigahertz.

The invention relates more specifically to thin films, and particularly to the thin films that are a constituent of microwave circuits, as employed in said radio-frequency transceivers.

BACKGROUND OF THE INVENTION

Microwave circuits are commonly used in the telecommunications field, where they are a constituent of transmission/reception chains, which include in particular antennae and radio-frequency analog circuits for signal processing (filters, impedance matching, amplification).

High levels of compactness, efficiency and integration are therefore looked for in respect of these circuits, and particularly in respect of the radiating elements built into the design of the antennae and of the resonating elements useful for the filters and the impedance matching. To satisfy such requirements, substrates need to be designed that have the special feature of possessing high permittivity and permeability values in the micro-wave frequencies, in other words frequencies of between 1 and 20 gigahertz. Indeed, said materials can be used to meet the needs for circuits with high levels of compactness and therefore of integration, and for substrates that are functionalized, in terms for example of band gap, "left-hand" properties and frequency agility.

A plurality of paths have thus been explored in relation to the constituent materials of microwave circuit substrates, such as for example using so-called "high K" dielectric materials or adapting low frequency piezoelectricity techniques to the microwave field.

However, there is no material known today that possesses both high permittivity and high permeability in the microwave frequency field.

Ferrites have certainly been the subject of intensive research to this end, but their permeability by permittivity product is difficulty reaching a value of a hundred in the micro-wave frequencies, which proves unsatisfactory.

One solution to obtain the looked-for properties therefore comprises combining high permittivity dielectric materials with high-permeability ferromagnetic materials in the frequency band of interest. This combination has not hitherto been possible since the development of a high-permittivity dielectric material, such as a stoichiometric oxide, like $HfO_2$, $Ta_2O_5$, $BaTiO_3$ or $SrTiO_3$ for example, requires the use of a method involving significant (deposition or anneal) temperatures, and typically above 500° C., while ferromagnetic materials (such as NiFe, CoZrNb, FeHfN, FeCoB etc.,) cannot withstand said temperatures, without seeing their magnetic properties drastically reduced. There is therefore currently a technical incompatibility preventing the manufacture of a composite material of high permittivity and high permeability.

SUMMARY OF THE INVENTION

The purpose of the present invention is to resolve the aforementioned problem by proposing magneto-dielectric elements comprising a thin film offering both high permittivity and high permeability, in other words each above ten.

To this end the object of the invention is a radio-frequency device whereof at least one magneto-dielectric element comprises a composite thin film including a stack of thin layers consisting of magnetic material with permeability above 10 at 1 GHz, and of a dielectric material with permittivity above 10 at 1 GHz.

Thin film, or thin layer, is here taken to mean a layer with a thickness of below 10 µm.

The particular combination resulting from the stack specified by the invention constitutes a definitive break relative to the magneto-dielectric materials (garnets, ferrites etc.,) known from the prior art. Indeed, such materials are restricted beyond a few hundred Megahertz (without recourse to an external polarization technique), while the characteristic inventive stack can operate in respect of frequencies above some tens of Gigahertz (without recourse to an external polarization technique).

The invention therefore marks itself out comparatively by proposing a composite magneto-dielectric film in thin layers that combines high permeability and high permittivity in the microwave field.

To advantage, the permeability of the magnetic material is above 100 at 1 GHz. Moreover, the permittivity of the dielectric material is to advantage above 100 at 1 GHz.

According to the invention, the magnetic material and the dielectric material are arranged in the faun of thin layers. The film may be obtained by physical (vapor) or chemical deposition methods.

According to one advantageous inventive feature, the magnetic material is a ferromagnetic material, with the magnetization thereof being above 1 T, and to advantage above 2 T. To advantage, it is coupled via exchange coupling with an antiferromagnetic material.

The exchange coupling occurring between the layer of ferromagnetic material and the layer of antiferromagnetic material occurs at the interface between these two layers, thereby ensuring sufficiently high anisotropic energy (magnetic polarization) to extend the dynamic performance (permeability) of the layers of ferromagnetic material at very high frequency, and in the case in point, in the field of interest.

Thus, and by means of this anisotropy, it is possible to obtain high permeability at very high frequencies, and typically up to 20 Gigahertz without recourse to external magnetic polarization means such as an electromagnet for example which is not compatible with the field of interest.

Moreover, because of this coupling, the ferromagnetic material has a saturated remanent state (magnetic domain free). The soft magnetic properties of a ferromagnetic material are produced so long as the grains are small in size and highly contiguous. This means that the magnetocrystalline anisotropy constant present in each grain and which tends to reduce the mobility of the magnetic walls, thereby penalizing the soft character being looked for, can be cancelled or significantly reduced. In fact, excessive heating of a ferromagnetic material on its own causes growth in the grains and/or oxidation of the grain joints which tends to decouple them, thereby degrading the soft magnetic properties of the ferromagnetic material. The effect of the saturated remanent state of the ferromagnetic material obtained by its coupling with the antiferromagnetic material is that the magnetic properties of this combination depend less on the size of the grains forming the ferromagnetic material. It is thus possible to bring this combination to a temperature above 300° C. without the permeability suffering thereby.

According to the invention, the ferromagnetic material is selected from the group that includes alloys of Fe and Co and Ni, and any compound associating two or all three of these elements and possibly doped with Boron and Nitrogen (NiFe, CoNiFe, CoFe, CoFeB, FeN, CoFeN+possibly X with X=Al, Si, Ta, Hf, Zr etc.)

The corollary of this is that the antiferromagnetic material is an alloy based on manganese, and in particular based on IrMn, PtMn or NiMn or an oxide of Fe or Co.

The dielectric material is for its part selected from the group that includes the oxides of tantalum, titanium, hafnium, strontium, niobium and to advantage the perovskites (paraelectric or ferroelectric), and more particularly the titanates of barium and strontium.

To advantage, the magnetic material includes at least one layer of ferromagnetic material inserted in exchange coupling between two antiferromagnetic layers and/or a layer of antiferromagnetic material inserted in exchange coupling between two ferromagnetic layers. An arrangement of this kind can be used to give a saturated remanent state of the ferromagnetic material and to simplify the method of manufacturing the magnetic material through the possible use of a higher manufacturing temperature.

The invention also covers the method of embodying said device. According to this method, a layer of ferromagnetic material (possibly coupled with one or two antiferromagnetic layers) and a layer of dielectric material are alternately deposited by ion beam sputtering in a vacuum enclosure.

The stack so obtained is compatible with technological steps involving temperatures of up to 400° C., thereby allowing the dielectric material to be deposited at such temperatures or anneals that promote the crystalline character of the layer of dielectric material when it is deposited amorphously at a lower temperature, while preserving the magnetic properties of the layers of ferromagnetic and antiferromagnetic materials.

According to this method, the layers of ferromagnetic and antiferromagnetic material are also deposited by ion beam sputtering.

BRIEF DESCRIPTION OF THE FIGURES

The specification will be better understood from reading the following description, given solely by way of example, and given in relation to the appended drawings, wherein identical reference numbers denote identical or similar elements, and wherein.

DETAILED DESCRIPTION OF THE INVENTION

Figure 1:
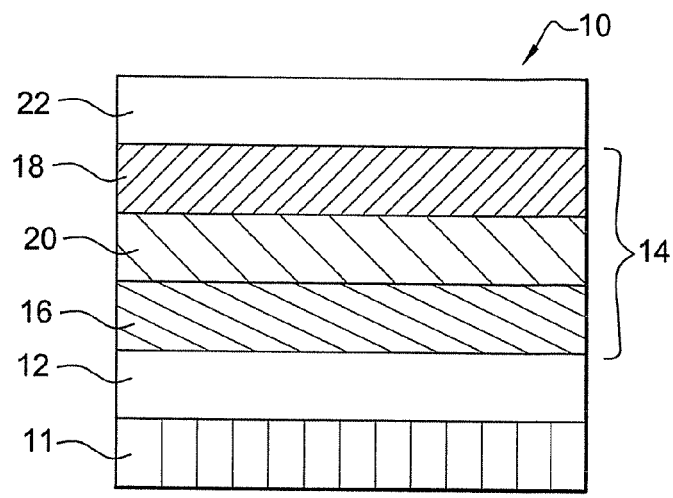
FIG. 1 is a diagrammatic cross-section view of a first inventive embodiment.

In FIG. 1, a thin film 10 comprises:
a substrate 11, such as a silicon substrate, preferably surface oxidized ($SiO_2$);
a first layer 12 with a thickness of between 10 and 100 nm of high-permittivity dielectric material, in other words of high-permittivity above ten (at 1 GHz) or even above 100;
an alternation 14 of two layers 16, 18 of ferromagnetic material with high micro-wave permeability (above 10 at 2 GHz, or even above 100, with a loss tangent below 0.1 over the entire band), which corresponds to a ferromagnetic material with magnetization above 1 T (or even above 2 T), and of a layer 20 of antiferromagnetic material. The thickness of the ferromagnetic layers is of the order of between 10 and 100 nm, that of the antiferromagnetic layer of the order of between 0.7 and 30 nm
a second layer 22 of high-permittivity dielectric material deposited on the last layer 18 of ferromagnetic material.

The dielectric material of the layers 12 and 22 is to advantage an oxide of strontium (Sr) and titanium (Ti), and in particular strontium titanate $SrTiO_3$, (paraelectric material), whereof the amorphous to perovskite phase transition temperature, and therefore the manufacturing temperature, is less than or equal to 400° C.

The ferromagnetic material constituting the layers 16, 18 is for its part to advantage an alloy based on iron (Fe) and/or cobalt (Co) and/or nickel (Ni), and particularly FeCo or FeCoB, which naturally offers very high saturation magnetizations, typically magnetizations close on 2 T.

The antiferromagnetic material of the layer 20, inserted between the layers 16, 18 of ferromagnetic material, is for its part constituted to advantage by an alloy based on manganese (Mn), and particularly NiMn.

According to the invention, the ferromagnetic material could be used on its own (not associated with an antiferromagnetic material). However said association is particularly advantageous since it allows the stack to withstand high temperatures (of about 400° C. for the association FeCo/NiMn) while preserving good permeability properties.

Thus, by using $SrTiO_3$ as the dielectric material, FeCo and/or FeCoB as the ferromagnetic material and NiMn as the antiferromagnetic material, temperature compatibility is obtained, since the combination of the ferromagnetic material with the antiferromagnetic material withstands a temperature of between 300° C. and 400° C. as required to form the perovskite phase of the dielectric material.

As an alternative, other materials may be used as a dielectric 12, and for example an oxide of barium (Ba) and titanium, and in particular Barium titanate $BaTiO_3$, an oxide of hafnium (Hf), and in particular $HfO_2$, or tantalum (Ta), and in particular $Ta_2O_5$ (ferroelectric). Preference will nonetheless be given to perovskites such as $BaTiO_3$ or $SrTiO_3$ for example, which offer higher permittivity (of about 100 as opposed to 10 for the Barium or hafnium oxides).

Other materials are also possible for the antiferromagnetic layer 20, such as a PtMn or IrMn alloy and more generally all manganese-based alloys or iron or cobalt or nickel oxides.

For the ferromagnetic layer, preference will be given to CoFeB, FeN and CoFeN, but other materials are possible, and in particular all alloys associating two or three of the elements selected from iron, cobalt and nickel. These alloys may possibly be doped, for example with boron or nitrogen. They may also be associated with other elements such as Al, Si, Ta, Hf, Zr etc.

The different combinations of para/ferroelectric, ferromagnetic and antiferromagnetic materials described above can be used to give thin films that have a permittivity by permeability product above 100, or even above 1000, with low respective loss tangents, typically less than 0.1 or even 0.01, and for frequencies of up to some twenty gigahertz.

Furthermore, the choice of materials and the thickness of the different layers give the designer free choice in balancing the permittivity and permeability values in order to select the impedance of the thin film. To advantage, when no impedance mismatch with air is required, the permittivity and permeability values of the thin film will be selected so as to give an impedance close to that of air for the thin film. For other uses however, other values may be chosen: for the antennae for example, a mu/epsilon ratio of >1 is generally recommended in order not to degrade the pass band.

FIG. 1 shows an alternation 14 of two layers of ferromagnetic material 16, 18 with a layer of antiferromagnetic material 20.

Figure 2:
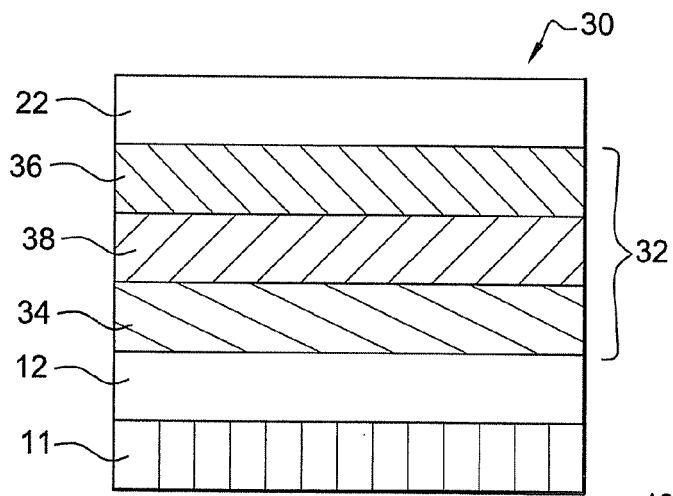
FIG. 2 is a diagrammatic cross-section view of a second inventive embodiment.

FIG. 2 shows a thin film 30 offering an alternation 32 of two layers of antiferromagnetic material 34, 36 with a layer of ferromagnetic material 38.

However, the embodiment in FIG. 1 is preferred because the layer of antiferromagnetic material is further away from the layer of dielectric material than in the embodiment in FIG. 2. Indeed, during the manufacture of the thin film, the layer of antiferromagnetic material in contact with the layer of dielectric material may be degraded by the migration of oxygen at the interface, particularly when the antiferromagnetic material contains manganese.

Figure 3:
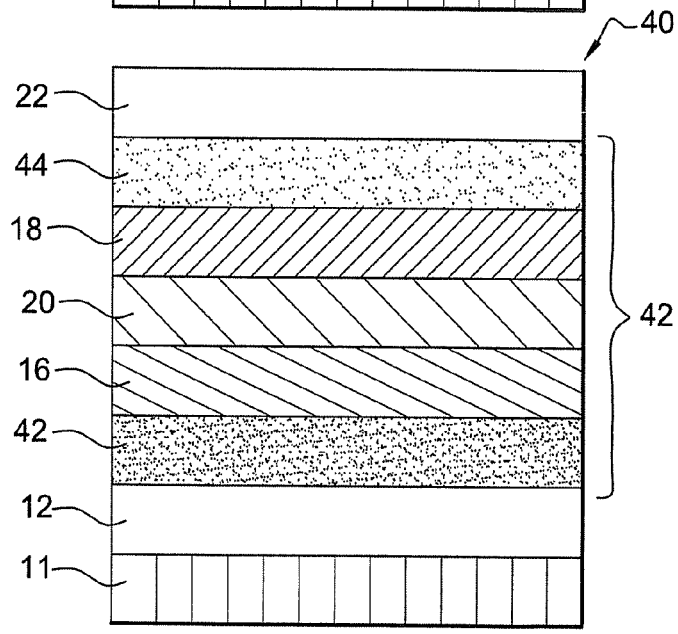
FIG. 3 is a diagrammatic cross-section view of a third inventive embodiment.

FIG. 3 shows an embodiment similar to those in FIGS. 1 and 2, except that the combination of ferromagnetic and antiferromagnetic layers is separated from the dielectric layers by intermediate layers.

For example, starting from the embodiment in FIG. 1, an intermediate layer 42 is inserted between the dielectric layer 12 and the ferromagnetic layer 16, and an intermediate layer 44 is inserted between the ferromagnetic layer 18 and the dielectric layer 22. The intermediate layers 42, 44 act as growth layer or protection layer (diffusion barrier in particular) and are to advantage constituted by ruthenium (Ru) or tantalum (Ta) or platinum (Pt). Ruthenium however allows favorable crystalline growth and constitutes a good interdiffusion barrier.

Although a single alternation of ferromagnetic and antiferromagnetic layers (ferromagnetic/antiferromagnetic/ferromagnetic or antiferromagnetic/ferromagnetic/antiferromagnetic) has been described, stacking a plurality of alternations is possible depending on the use required. Increasing the effective thickness improves for example the efficiency of the interaction between the waves and the environment in the case of an antenna. The increase in matter allows the signal to be increased.

It is also possible in place and instead of the magnetic stack included between two dielectric layers, for a stack to be implemented wherein the dielectric layer is inserted between two magnetic stacks (ferromagnetic material on its own, or in association with an antiferromagnetic material, with possibly intermediate layers as in the examples previously described etc.)

Figure 4:
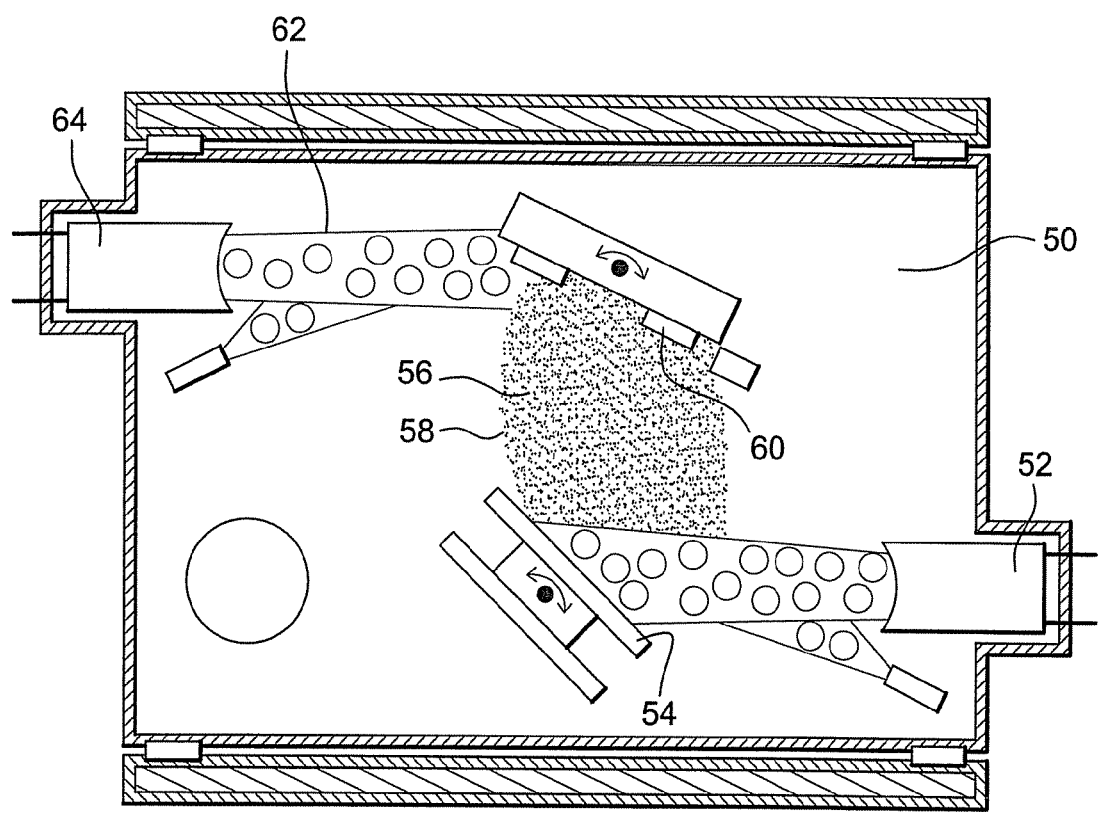
FIG. 4 is a diagrammatic view of an ion beam sputtering facility employed to manufacture a thin film in accordance with FIGS. 1 to 3.

FIG. 4 shows diagrammatically an ion beam sputtering device, which is employed to advantage in order to produce the thin films described in relation to FIGS. 1 to 3.

Ion beam sputtering is a physical vapor deposition technique according to which, in an enclosure put into a vacuum 50, ions are produced by a source 52 and are accelerated towards the material for sputtering 54. According to this technique, the ion source 52 generates a beam of positive mono-energetic ions (with an energy of typically between 500 and 1500 eV), the beam being defined spatially. The ion beam, usually $Ar^+$ ions, bombards a target 54 constituted by the material it is wished to deposit. The particles 56 so sputtered by the ion beam are emitted into the half-space 58 facing the target and are condensed onto a surface which may or may not be heated 60 in order to form a layer of the material constituting the target.

An ancillary or so-called support source 64 can be used to improve deposition uniformity by increasing the mobility of the species at the surface by a secondary low energy bombardment. It also allows oxygen for example to be added so that the stoichiometry of some oxides can be made denser or better controlled.

Ion beam sputtering is particularly advantageous for depositing the layer of dielectric material of stoichiometric composition directly from the target of same composition. Moreover oxygen gas may advantageously be injected either in the deposition gun or in the support gun, which means that the compactness of the deposited layers can be increased, but also that the stoichiometry of the layers of dielectric materials can be controlled, an important feature for perovskites, such as $SrTiO_3$ or $BaTiO_3$.

Ion beam sputtering is also advantageous for depositing a layer of ferromagnetic material onto a layer of antiferromagnetic material, and vice versa, in so far as the absence of plasma in the environment of the layer during deposition allows growth with few defects, and guarantees high interface qualities, thereby ensuring good control of the properties of films involving stacks of a plurality of layers of nanometric thickness.

Furthermore, ion beam sputtering allows perovskites such as $SrTiO_3$ or $BaTiO_3$ to be deposited with an amorphous to perovskite transition temperature of between 300° C. and 400° C. The entire stack of dielectric, antiferromagnetic and magnetic layers can thus be produced using this technique.

IBS deposition is particularly advantageous. Nonetheless other embodiment techniques are conceivable in so far as the temperatures employed allow the properties of the different materials involved to be preserved. The ferromagnetic, antiferromagnetic layers, and the intermediate layers could for example be deposited by Physical Vapor Deposition (PVD) for example, and the perovskite STO then deposited on the stack by chemical means, as described in the article by M. Niederberger et al ("*A general soft-chemistry route to perovskites and related materials: synthesis of $BaTiO_3$, $BaZrO_3$, and $LiNbO_3$, nanoparticles*"—Angew. Chem. Int. Ed. 2004, 43, 2270-2273), and followed by PVD depositions. The temperatures employed in the chemical method of depositing the STO are of the order of 200/300° C., and therefore compatible with the magnetic materials which are underneath in the stack.

Layer transfer techniques might also be conceivable for the dielectric layer, for example by implantation of gaseous species (hydrogen and/or helium for example) in a dielectric layer, direct bonding of said layer onto the magnetic stack required and splitting in the implanted area.

The magneto-dielectric composite thin films in thin layers as described above thus combine high permeability and permittivity and are thus of particular use in the microwave field, and in particular in the manufacture of microwave circuits. Indeed, these thin films may be a constituent of the magneto-dielectric elements of radio-frequency devices, and particularly constitute a substrate for such devices, or a coating for a substrate, and/or be used in the formation of passive components (resonating elements, filters, couplers, inductances, baluns, delay lines, etc.) or radio-frequency antennae (including for example a coating formed of such a film, or obtained by forming an antenna pattern in a substrate including said film).

The invention claimed is:

1. A radio-frequency device operating between 1 GHz and 20 GHz, wherein at least one magneto-dielectric element comprises a composite thin film comprising a layer of magnetic material offering permeability above 10 at 1 GHz with a thickness of between 10 and 100 nanometers and a dielectric material made of a polycrystalline perovskite offering permittivity above 10 at 1 GHz with a thickness of between 10 and 100 nanometers, said polycrystalline perovskite being deposited by ion beam sputtering in a vacuum enclosure, wherein the magnetic material is constituted by ferromagnetic layers coupled via exchange coupling with antiferromagnetic layers, and wherein the layers of ferromagnetic and antiferromagnetic material are stacked and separated from the dielectric material by at least one intermediate layer, acting as a growth layer or protection layer.

2. The radio-frequency device as claimed in claim 1, wherein the permeability of the magnetic material is above 100 at 1 GHz.

3. The radio-frequency device as claimed in claim 1, wherein the permittivity of the dielectric material is above 100 at 1 GHz.

4. The radio-frequency device as claimed in claim 1, wherein the magnetic material and the dielectric material are arranged in the form of thin layers.

5. The radio-frequency device as claimed in claim 1, wherein the magnetic material includes a ferromagnetic material with the magnetization thereof being above 1 T.

6. The radio-frequency device as claimed in claim 5, wherein the ferromagnetic material of the ferromagnetic layers is selected from the group consisting of alloys of Fe and Co and Ni, and any compound that associates two or all three of these elements.

7. The radio-frequency device as claimed in claim 6, wherein the ferromagnetic material is doped with at least one selected from the group consisting of Boron and Nitrogen.

8. The radio-frequency device as claimed in claim 6, wherein the ferromagnetic material is selected from the group consisting of NiFe, CoNiFe, CoFe, CoFeB, FeN, and CoFeN.

9. The radio-frequency device as claimed in claim 8, wherein said compound further comprises at least one of Al, Si, Ta, Hf, and Zr.

10. The radio-frequency device as claimed in claim 1, wherein an antiferromagnetic material of the antiferromagnetic layers is selected from the group consisting of alloys based on manganese or an oxide of Fe or Co.

11. The radio-frequency device as claimed in claim 10, wherein the alloys based on manganese are selected from the group consisting of alloys based on IrMn, PtMn, and NiMn.

12. The radio-frequency device as claimed in claim 1, wherein the dielectric material is selected from the group consisting of titanates of barium and strontium.

13. The radio-frequency device as claimed in claim 1, wherein the intermediate layer is made out of a material selected from the group consisting of platinum, ruthenium and tantalum.

14. The radio-frequency device as claimed in claim 1, wherein the magnetic material includes at least one layer of ferromagnetic material inserted in exchange coupling between two antiferromagnetic layers and/or a layer of antiferromagnetic material inserted in exchange coupling between two ferromagnetic layers.

15. A method for making a radio-frequency device as claimed in claim 1, wherein the layers of dielectric material are deposited by ion beam sputtering in a vacuum enclosure, and wherein a stack constituting the film is subjected to an operation of depositing or annealing the dielectric material at a temperature at the most equal to 400 ° C.

16. The radio-frequency device as claimed in claim 1, wherein the magnetic material includes a ferromagnetic material with the magnetization thereof being above 2 T.

17. A radio-frequency device operating between 1 and 20 GHz, wherein at least one magneto-dielectric element comprises a composite thin film comprising a magnetic material offering permeability above 10 at 1 GHz and a dielectric material made of a polycrystalline perovskite offering permittivity above 10 at 1 GHz, said polycrystalline perovskite being deposited by ion beam sputtering in a vacuum enclosure, wherein said magnetic material comprises a layer of ferromagnetic material interposed between two antiferromagnetic layers and coupled via exchange coupling with said antiferromagnetic layers and/or an antiferromagnetic layer interposed between two ferromagnetic layers and coupled via exchange coupling with said ferromagnetic layers, and wherein the layers of ferromagnetic and antiferromagnetic material are separated from the dielectric material by at least one intermediate layer.

* * * * *